United States Patent
Agarwal

(10) Patent No.: US 11,232,024 B2
(45) Date of Patent: Jan. 25, 2022

(54) PREDICTIVE CACHING IN DEVICE FOR MEDIA SEEK IN PLAYBACK OR SCROLLING

(71) Applicant: Western Digital Technologies, Inc., San Jose, CA (US)

(72) Inventor: Dinesh Kumar Agarwal, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 29 days.

(21) Appl. No.: 16/909,751

(22) Filed: Jun. 23, 2020

(65) Prior Publication Data

US 2021/0397548 A1 Dec. 23, 2021

(51) Int. Cl.
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0659* (2013.01); *G06F 3/0679* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 7,437,502 B1 * | 10/2008 | Coker | ................... | G11B 5/5547 360/69 |
| 7,450,334 B1 * | 11/2008 | Wang | ................... | G06F 12/0862 360/75 |
| 2008/0229070 A1 * | 9/2008 | Charra | .................... | G06F 9/383 712/207 |
| 2010/0162126 A1 * | 6/2010 | Donaldson | .......... | G06F 16/9574 715/738 |
| 2014/0189037 A1 * | 7/2014 | Stockwell | ........... | G06F 16/9574 709/213 |

* cited by examiner

*Primary Examiner* — Kevin Verbrugge
(74) *Attorney, Agent, or Firm* — Chang & Hale LLP

(57) ABSTRACT

Systems and methods are disclosed for predictive caching of media data for seek operations or scroll operations. In certain embodiments, a data storage device includes a non-volatile memory, a buffer, and a controller configured to receive from a host a seek command associated with playback of a media file, the seek command including a seek interval. The controller can be further configured to determine a number of seek points; estimate respective logical block address (LBA) ranges corresponding to one or more seek points based on the seek interval; determine respective control pages corresponding to the estimated LBA ranges; load the control pages to the buffer in parallel; load data corresponding to the estimated LBA ranges to the buffer in parallel based on the loaded control pages; and provide the loaded data to the host.

20 Claims, 7 Drawing Sheets

PREDICTIVE CACHING IN DEVICE FOR MEDIA SEEK IN PLAYBACK OR SCROLLING

BACKGROUND

Field

The present disclosure relates to data storage systems. In particular, the present disclosure relates to predictive caching in data storage systems for media data or other types of data.

Description of Related Art

Users may access data, such as files, in various types of data storage systems/architectures. As an example, users may request media data from media servers, which in turn may access requested media data from storage systems in order to provide to users. Media data requested by users can be played back by media players on user devices. Users may perform seek operations or scroll operations relating to media data.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Predictive Caching Storage System

Users may request or access different types of data from storage systems, for example, using one or more applications. In some cases, data can be media data, and users may request playback of media data from media servers. For example, users may access media files using media players on user devices. Media servers in turn may access and provide requested media data from storage systems. Requested media data transmitted to user devices may be played back using media players. Users may perform various operations relating to media data during playback, including seek operations or scroll operations.

According to certain aspects, a media server and/or a storage system can generally buffer sequential data for current data being played back on a user device. If a user performs a seek operation or a scroll operation while the current data is being played back on the user device, data corresponding to one or more seek points may not have been buffered at the media server and/or the storage system. This can lead to a cache miss and performance issues in loading data corresponding to seek points on the user device, due to latency in transmitting the data from the storage system and the media server.

Figure 1:
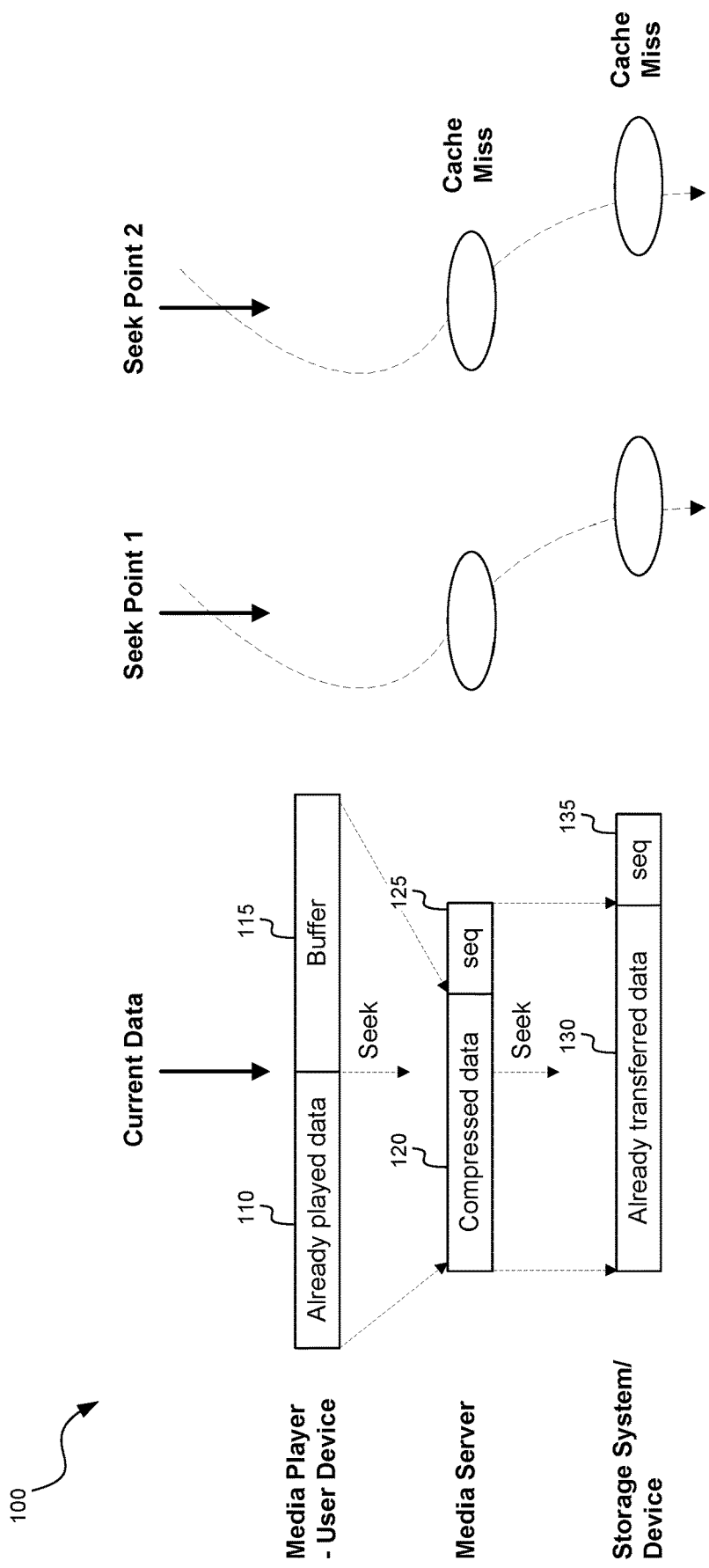
FIG. 1 is a block diagram illustrating seek operations or scroll operations relating to playback of media data, in accordance with one or more embodiments.

FIG. 1 is a block diagram 100 illustrating seek operations or scroll operations relating to playback of media data. Referring to FIG. 1, a user may play a media file using a media player on a user device. FIG. 1 shows media data for a user device (e.g., media player), media data for a media server, and media data for a storage system or device. Current data can indicate data that is currently being played back by the media player. Media data for the user device/media player can include a first portion 110 indicating data that has already been played and a second portion 115 that has not yet been played by the media player. For example, the user device can receive compressed data from the media server and decode the compressed data. The first portion 110 and the second portion 115 on the user device can correspond to a first portion 120 of media data on the media server that has been transferred to the user device. A second portion 125 of media data can include sequential data for the first portion 120 and can be buffered at the media server. The first portion 120 and the second portion 125 of media data on the media server can correspond to a first portion 130 of media data from the storage system/device that has been transferred to the media server. The storage system/device can also buffer a second portion 135 of media data that includes sequential data for the first portion 130.

While the current data is being played back, the user may perform a seek operation or a scroll operation. A seek operation or a scroll operation can navigate through or skip to another point within a file or data. For example, the media player may attempt to access media data corresponding to Seek Point 1 and/or Seek Point 2 as shown in FIG. 1. When the user performs a seek operation or a scroll operation, media data at the media server and media data at the storage system corresponding to one or more seek points may not have been buffered and therefore not available. Accordingly, a cache miss can occur on the media server and the storage system, leading to performance issues.

In order to address these and other challenges, a storage system can perform predictive caching for seek operations or scroll operations relating to data, according to certain embodiments. When a user performs a seek operation or a scroll operation during playback of a media file on a user device, a storage system or device can receive a seek command from a media server and/or the user device. In response to receiving the seek command, the storage system can estimate logical block address (LBA) ranges corresponding to one or more seek points for the media file. For example, for each seek point, an LBA range of the media file corresponding to the seek point can be estimated. The storage system may estimate the LBA ranges based on the bit rate of the media file, average frame length for the media file, frame length list for the media file, etc. The storage system can determine control pages corresponding to the estimated LBA ranges and load the control pages in parallel to a buffer in order to retrieve the data for the LBA ranges. The storage system then can retrieve and load the data for the LBA ranges in parallel to the buffer. The data for the LBA ranges can be provided to the media server and the user device. By estimating and loading data for one or more seek points in advance when the seek command is received, the storage system can reduce latency in providing the data to the media server and the user device. The storage system for predictive caching is described in the context of playback of media data for illustrative purposes, but may apply to any type of data to which seek operations or scroll operations can be applied. Details relating to the storage system for performing predictive caching are provided below.

Figure 2:
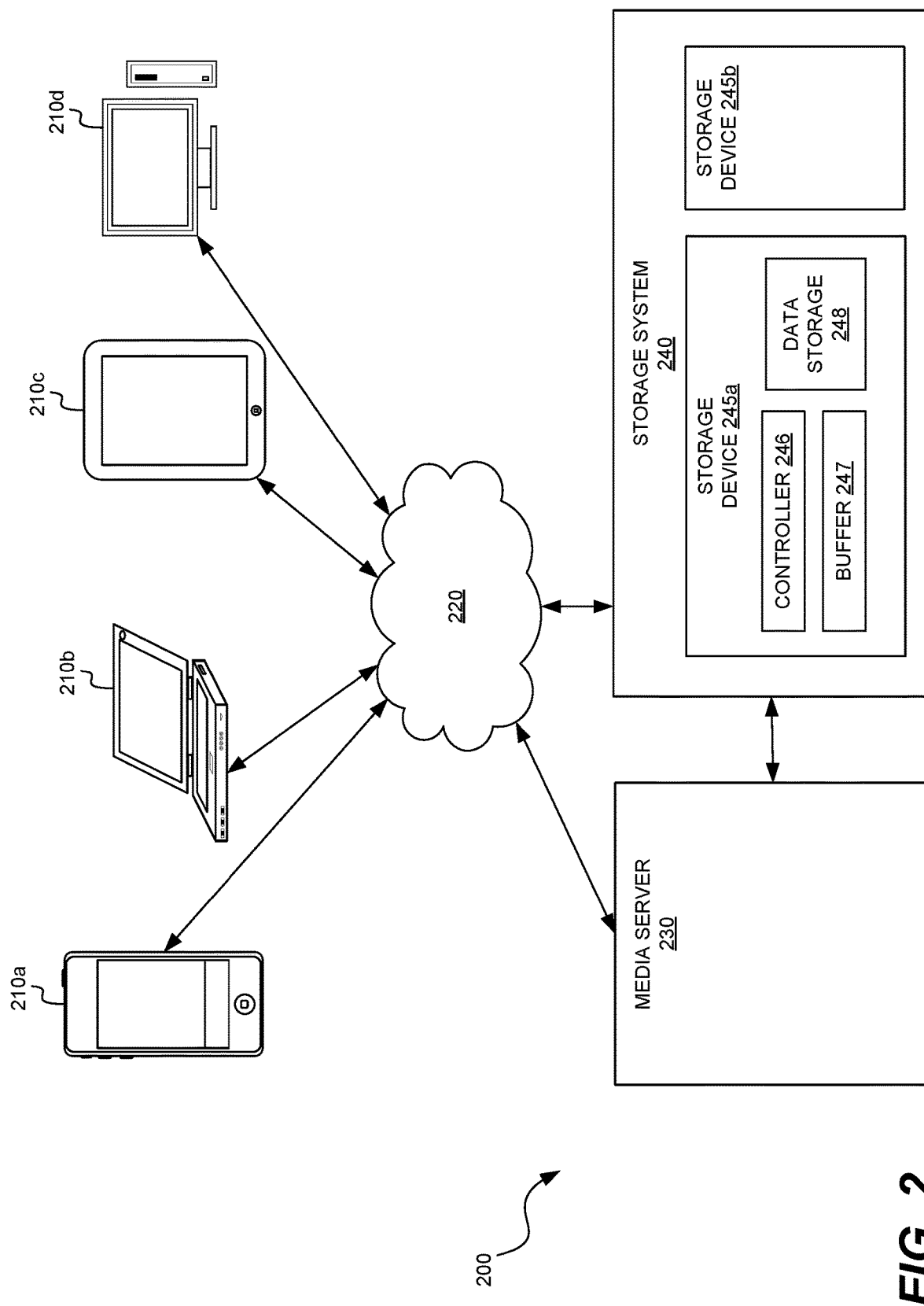
FIG. 2 illustrates an example system architecture for an example storage system relating to predictive caching for media data, in accordance with one or more embodiments.

FIG. 2 illustrates an example system architecture 200 for an example storage system 240 relating to predictive caching for media data, in accordance with one or more embodiments. The architecture 200 can include one or more user or client computing devices 210, which may be coupled to one or more media servers 230 via a network 220. Types of client computing devices 210 that may access the storage system 240 can include phones 210a, such as smartphones, laptop computers 210b, tablet computers 210c, desktop computers 210d, wearable computers and/or other network-connected computing devices. The network 220 may be a local area network (LAN), a wide area network (WAN) (e.g., the Internet), or other type of computer network, and the connections between the various client components of the architecture 200 and the network 220 may be either wired or wireless.

The architecture 200 can also include the storage system 240 for performing predictive caching relating to media data. The media server 230 may be coupled to the storage system 240 directly or via the network 220. The storage system 240 can include one or more storage devices 245. A storage device 245a can include a controller 246, a buffer 247, and data storage 248 (e.g., non-volatile memory). A storage device 245b can also include similar components. The storage system 240 may store data and/or data objects that may be accessed by the media server 230 and the client computing devices 210. The storage system 240 may include multiple storage devices 245 (e.g., multiple storage drives such as hard disk drives (HDDs), solid state drives (SSDs), etc.). A storage device 245 may comprise magnetic media (e.g., magnetic discs, shingled magnetic recording (SMR) media/discs, etc.) and/or solid-state media.

While certain embodiments are described herein, it should be understood that different types of storage devices and RAM technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as resistive random-access memory (ReRam), phase-change memory (PCM), and magnetoresistive random-access memory (MRAM).

A user can access and play a media file on a client computing device 210 using a media player. For example, the client computing device 210 can send a request to a media server 230 for playback of the media file, and the media server 230 can retrieve the media file from the storage system 240. The media file can be provided to the client computing device 210, for example, for streaming. In some cases, the media server 230 and the client computing device 210 may be a part of or implemented on the same computing device. In some embodiments, a "host" can refer to a system or device from which media data on a storage system or device is accessed or requested. For instance, the client computing device 210 or the media server 230 can be a host, depending on the embodiment. In some embodiments, a "device" can refer to a storage system or device from which media data is obtained, for example, to provide to a host.

During playback of the media file on the client computing device 210, the user can perform a seek operation or a scroll operation for the media file. When the user performs a seek operation, a seek command is sent from the client computing device 210 to the media server 230, and the media server 230 can send a seek command to the storage system 240. For example, a seek command can include information such as current data being played back, a seek interval, etc. The storage system 240 can receive the seek command and perform predictive caching for the media file relating to one or more seek points. For instance, a storage device 245 storing the media file can receive and process the seek command. The controller 246 can estimate LBA ranges for the one or more seek points, load control pages corresponding to the LBA ranges, and load data corresponding to the LBA ranges to the buffer 247. The loaded data corresponding to the LBA ranges can be sent to the media server 230, and the media server 230 can send the received loaded data to the client computing device 210.

Figure 3:
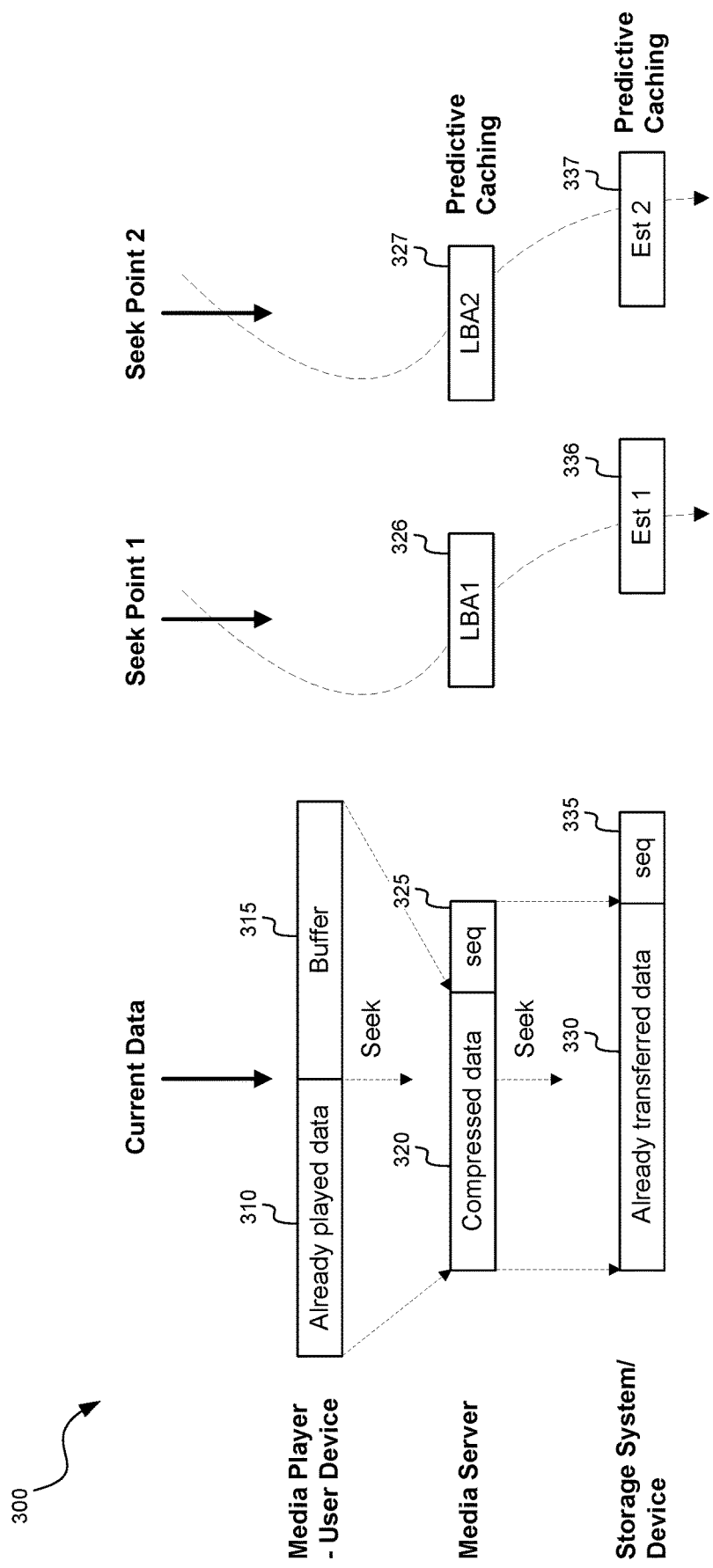
FIG. 3 is a block diagram illustrating predictive caching for media data, in accordance with one or more embodiments.

FIG. 3 is a block diagram 300 illustrating predictive caching for media data, in accordance with one or more embodiments. For example, predictive caching for media data can be performed by the example storage system 240 and/or storage device 245 in FIG. 2. Similar to FIG. 1, a user can play a media file using a media player on a client computing device 210. A media file may be compressed. A media file can include one or more frames. Types of frames can include an I-frame, a P-frame, a B-frame, etc. An I-frame or an intra-coded frame can indicate a frame that can be decoded without referring to other frames. A P-frame or a predicted frame can indicate a frame that refers to a previous frame for decoding. A B-frame or a bidirectional predicted frame can indicate a frame that refers to a previous frame or a subsequent frame for decoding. The media player can receive compressed media data and decode the compressed media data at the client computing device 210. A bit rate can indicate a number of bits that are processed per unit of time. A frame length can indicate an amount of data included in a frame, such as a number of bits or bytes. In some cases, the bit rate may vary over the course of playback of a media file. For instance, the bit rate of a media file can be variable. The frame length may also vary from frame to frame for a media file, for example, based on compression.

FIG. 3 shows media data for a client computing device 210 (e.g., media player), media data for a media server 230, and media data for a storage system 240/storage device 245. Current data can indicate data that is currently being played back by the media player. Media data for the client computing device/media player 210 can include a first portion 310 indicating already played data and a second portion 315 indicating buffered data that has not yet been played by the media player. The client computing device 210 can receive compressed data from the media server 230, and the media player can decode the compressed data. For example, the first portion 310 and the second portion 315 can indicate decoded data. The first portion 310 and the second portion 315 on the client computing device 210 can correspond to a first portion 320 of media data for the media server 230 that has been transferred to the client computing device 210. A second portion 325 can indicate sequential data to the first portion 320, which can be buffered at the media server 230. The first portion 320 and the second portion 325 of media data for the media server 230 can correspond to a first portion 330 of media data for the storage system 240/storage device 245, which can indicate already transferred data. A second portion 335 of media data indicating sequential data to the first portion 330 can be buffered at the storage system 240/storage device 245. Media data on the media server 230 and the storage system 240/storage device 245 can be compressed data.

While the current data is being played back, the user may perform a seek operation or a scroll operation for the media file. A seek operation or a scroll operation can navigate through or skip to another point within the media file. A seek operation or a scroll operation can be forward or backward. In some cases, a seek operation can occur at a regular interval and skip to the next seek point. When the user performs the seek operation or the scroll operation during playback of the media file, the storage system 240/storage device 245 can receive a seek command from the media server 230 and/or the client computing device 210. For example, the media server 230 can receive a seek command from the client computing device 210, and the media server 230 in turn can send a seek command to the storage system 240. When the user performs the seek operation or the scroll operation, data subsequent to the current data being played back, including buffered data, at the client computing device 210, the media server 230, and/or the storage system 240 may be discarded.

The seek command can include various parameters or information associated with predictive caching of media data. For example, the seek command can include information such as current data for playback and/or a seek interval. The current data for playback may be indicated as a time, in units of time (e.g., seconds, minutes, etc.), in units of data (e.g., bit, byte, kilobyte, megabyte, etc.), etc. The seek interval may be indicated in a unit of time (e.g., seconds, minutes, etc.). Examples of a seek interval specified in a unit of time can include 10 seconds, 30 seconds, 1 minute, 10 minutes, etc. In some cases, the seek interval may be indicated as a multiple of a predetermined value. The storage system 240 may be able to identify the predetermined value based on preconfigured settings on the storage system 240. For example, the storage system 240 can receive and store preconfigured settings associated with media players in advance. Examples of a seek interval specified as a multiple of a predetermined value can include 1x, 2x, etc., where "x" indicates the predetermined value. For instance, "x" can be specified in a unit of time. Examples of "x" can include 10 seconds, 30 seconds, 1 minute, 10 minutes, etc. The client computing device 210 and/or the media server 230 can also send additional information, such as a bit rate for playback, an average frame length, a frame length list, etc. The additional information may be included in the seek command or may be sent separately.

In some embodiments, the storage system 240 can receive and store preconfigured settings associated with media players. For instance, the client computing device 210 and/or the media server 230 may send the preconfigured settings periodically or as needed. The storage system 240 can refer to the preconfigured settings when performing predictive caching. As an example, if a seek interval is specified as a multiple of a predetermined value, the storage system 240 can determine what the predetermined value is by referring to the preconfigured settings. As another example, the storage system 240 may determine what a seek interval is based on the preconfigured settings without receiving the seek interval from the media server 230 or the client computing device 210. In certain embodiments, the storage system 240 can receive settings associated with media players dynamically, for example, in real time. For instance, information or parameters that vary over time can be sent to the storage system 240 as needed.

In response to receiving the seek command, the storage system 240/storage device 245 storing the media file can process the seek command. The storage system 240 can estimate LBA ranges corresponding to one or more seek points for the media file. In some embodiments, the storage system 240 can determine the number of seek points for which to load data based on the size of the buffer 247. In certain embodiments, the storage system 240 can load data for a predetermined number of seek points. For each seek point, an LBA range of the media file corresponding to the seek point can be estimated. In the example of FIG. 3, two seek points are shown, but the storage system 240 can estimate LBA ranges for any number of seek points. The storage system 240 may estimate the LBA ranges based on the bit rate for the media file, average frame length for the media file, frame length list for the media file, etc. The media file on the storage system 240 can be compressed, and compression can vary from frame to frame. Therefore, in some cases, an LBA range for a seek point estimated by the storage system 240 may be approximate since the LBA range may not exactly correspond to actual media data for the seek point.

The storage system 240 can determine control pages corresponding to the estimated LBA ranges and load the control pages in parallel in order to retrieve the data for the LBA ranges. The storage system 240 then can retrieve and load the data for the LBA ranges in parallel to the buffer 247. The storage system 240 can provide the data for the LBA ranges to the media server 230, and the media server 230 can provide the data for the LBA ranges to the client computing device 210. In the example of FIG. 3, Est 1 336 can represent a control page and data corresponding to Seek Point 1 at the storage system 240, and Est 2 337 can represent a control page and data corresponding to Seek Point 2 at the storage system 240. LBA 1 326 can represent data corresponding to Seek Point 1 at the media server 230, and LBA 2 327 can represent data corresponding to Seek Point 2 at the media server 230. Since predictive caching relating to Seek Points 1 and 2 is performed when the seek command is received, the storage system 240 can reduce latency in sending the data for the seek points. Certain aspects of predictive caching for media data are described further below in connection with FIGS. 4 and 5.

Figure 4:
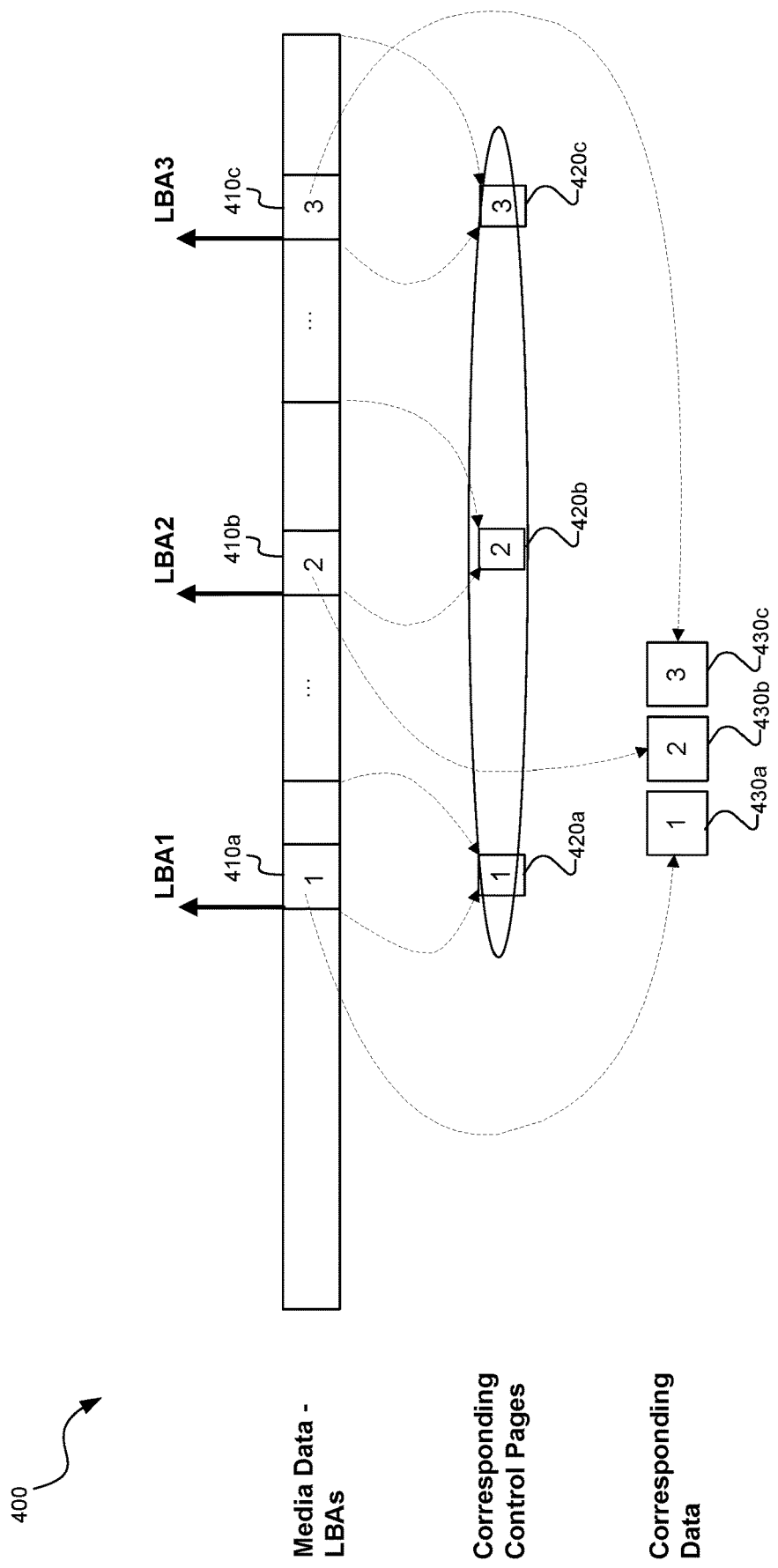
FIG. 4 is a block diagram illustrating predictive caching relating to seek points for media data, in accordance with one or more embodiments.

FIG. 4 is a block diagram 400 illustrating predictive caching relating to seek points for media data, in accordance with one or more embodiments. FIG. 4 shows a media file stored on a storage system 240/storage device 245. The storage system 240/storage device 245 may be referred to as the storage device 245 below to facilitate discussion. For example, the media file can be stored in data storage 248 of the storage device 245. Data of the media file can be accessed by LBAs. As described above, when the storage device 245 receives a seek command, the storage device 245 (e.g., the controller 246) can determine respective LBA ranges of the media file corresponding to a number of seek points. For instance, various operations relating to predictive caching of media data can be performed by the controller 246 of the storage device 245. As described above, the number of seek points may be determined based on the size of the buffer 247 and an amount of data to be loaded for a seek point. Or the number of seek points may be a predetermined number. In some embodiments, the number of seek points can be 3 or 4 at a minimum. In the example of FIG. 4, data is being retrieved for three seek points, and the storage system 245 estimates three LBA ranges corresponding to the three seek points. A first LBA range 410*a* can correspond to a first seek point, a second LBA range 410*b* can correspond to a second seek point, and a third LBA range 410*c* can correspond to a third seek point. Each LBA range 410*a-c* can have a start LBA and an end LBA.

The storage device 245 can determine one or more seek points based on a seek interval. A seek interval can indicate an interval to a subsequent seek point or between two seek points. The seek interval can be specified in a unit of time (e.g., 10 seconds) or as a multiple of a predetermined value (e.g., "x" or "1x"). The predetermined value can be determined from preconfigured settings stored on the storage device 245. The predetermined value may be specified in a unit of time (e.g., 10 seconds). The seek points can be determined in relation to current data being played back. Or the seek points can be determined in relation to current data for the media file that has been uploaded to the buffer 247 and/or transferred to the media server 230. As an example, if the seek interval is 10 seconds, three seek points can correspond to 10 seconds, 20 seconds, and 30 seconds from the current data. As another example, if the seek interval is x or 1x, three seek points can correspond to 1x, 2x, and 3x from the current data, where x can be 10 seconds. Accordingly, 1x, 2x, and 3x can correspond to 10 seconds, 20 seconds, and 30 seconds, respectively.

The storage device 245 can determine the start LBA of an LBA range 410 based on the seek interval and in relation to the current LBA. For example, an offset or an amount of data corresponding to the seek interval can be added to the current LBA or the start LBA of a previous seek point in order to determine the start LBA of an LBA range 410. In some embodiments, the current LBA can indicate an LBA corresponding to the current data being played back. For instance, the current data being played back can be received from the media server 230 and/or the client computing device 210 as a time and can be converted to the current LBA. In certain embodiments, the current LBA can indicate an LBA corresponding to current data for the media file that has been loaded into the buffer 247 and/or transferred to the media server 230. For example, the storage device 245 can keep track of the most recent or latest LBA(s) that have been uploaded and/or transferred. In some cases, the current data being played back on the client computing device 210 and the current data on the storage device 245 may not exactly correspond since the storage device 245 uploads into the buffer 247 sequential data for data that has already been transferred to the media server 230 and/or the client computing device 210. However, any difference between the current data being played back on the client computing device 210 and the current data on the storage device 245 may be small and can be close in time (e.g., playback time). Accordingly, determination of LBA ranges in relation to the current data being played back on the client computing device 210 and in relation to the current data on the storage device 245 can be similar. For instance, an amount of data for a seek point may be much larger than any difference between the current data being played back on the client computing device 210 and the current data on the storage device 245.

The offset or amount of data corresponding to the seek interval can be calculated in various ways. In one embodiment, the offset corresponding to the seek interval is calculated based on the bit rate for the media file. For example, the offset corresponding to the seek interval can be calculated as follows:

$$\text{offset} = \text{bit rate} * \text{seek interval} \quad (1)$$

The bit rate can be an average bit rate, a current bit rate, etc. The bit rate information may be received from the client computing device 210 and/or the media server 230. In some cases, historical bit rate information available on the storage device 245 can be used. In another embodiment, the offset corresponding to the seek interval is calculated based on the number of frames corresponding to the seek interval and the frame length for the media file. For instance, the offset corresponding to the seek interval can be calculated as follows:

$$\text{offset} = \text{number of frames} * \text{frame length} \quad (2)$$

The number of frames can be determined from the seek interval (e.g., 10 seconds, 1 minute, etc.), for example, by the storage device 245. The storage device 245 may obtain the number of frames per second (or another unit of time) for the media file and determine the number of frames corresponding to the seek interval. For example, if the number of frames per second ("fps") is 30 fps and the seek interval is 10 seconds, the number of frames corresponding to the seek interval can be 300 frames. The frame length can be an average frame length or based on a frame length list. A frame length list may include frame lengths for one or more frames. For example, the media server 230 and/or the client computing device 210 can provide frame length information to the storage device 245. In some embodiments, if a frame length list is received, the storage device 245 can determine an average frame length or actual frame lengths from the frame length list. In certain embodiments, if the frame length list is available, the storage device 245 can add frame lengths for the number of frames corresponding to the seek interval to calculate the offset, for example, instead of multiplying the number of frames and the frame length. For instance, the seek interval for a particular seek point can correspond to a particular set of n frames where n equals the number of frames corresponding to the seek interval, and frame lengths for the set of frames from the frame length list can be added to calculate the offset. If the number of frames corresponding to the seek interval is 300 frames, frame lengths for 300 frames corresponding to the seek interval for a particular seek point can be added to determine the offset for the seek point. The offset calculated based on the frame length list can be more accurate than the offset calculated based on the average frame length. In addition, the offset calculated based on the frame length list can be more accurate than the offset calculated based on the bit rate, for example, according to equation (1).

The start LBA of each LBA range 410 can be determined by adding the offset corresponding to the seek interval to the current LBA or the start LBA of a previous LBA range. The end LBA of an LBA range 410 can be determined based on an amount of data that should be loaded for each seek point. For example, an amount of data that is sufficient for playback of a seek point can be determined as appropriate. In some embodiments, the amount of data can be a predetermined number. An LBA range may be approximate since a media file can be compressed and the LBA range may not exactly correspond to media data for a seek point. Certain details relating to estimation of LBA ranges are further described below in connection with FIG. 5.

In an illustrative example, the seek interval can be 1 minute, and 1 minute may correspond to approximately 100 MB (megabytes) of data, for example, depending on the bit rate, compression, and/or other factors. The three seek points can be 1 minute, 2 minutes, and 3 minutes from the current data. In this example, an LBA range for a seek point may cover 1 MB of data. The LBA range 410a can correspond to 100 MB-101 MB, the LBA range 410b can correspond to 200 MB-201 MB, and the LBA range 410c can correspond to 300 MB-301 MB.

After the storage device 245 determines the LBA ranges 410a-410c, the storage device 245 can determine corresponding control pages 420a-420c for the LBA ranges 410a-410c. A control table or a lookup table may include information for mapping or converting LBAs to physical addresses. A control table may include one or more control pages. Each control page can include mapping information for a particular range or amount of data. For example, a 4 k (kilobyte) page can include mapping information for 4 MB of data, but the size of a control page and/or a range of data covered by a control page can be selected as appropriate. There can be a ratio between the size of a control page and the range of data covered by a control page. In the example of 4 k page and 4 MB data, the ratio of the size of the control page to the range of data is 1/1,000, or the ratio of the range of data to the size of the control page is 1,000/1. The storage device 245 can determine control pages corresponding to each of the LBA ranges 410a-410c in order to retrieve the data for each of the LBA ranges 410a-410c. In some embodiments, the start LBA of an LBA range can be divided by the ratio in order to determine a control page corresponding to the start LBA.

In the illustrative example, a 4 k control page can cover 4 MB of data. A control page covers an amount of data that is 1,000 times its size, and a control page including information for a particular LBA can be identified by dividing the LBA by 1,000. Accordingly, for the LBA range 410a, 100 MB can be divided by 1,000 to find a corresponding control page covering 100 k in the control table. For the LBA range 410b, 200 MB can be divided by 1,000 to find a corresponding control page covering 200 k in the control table, and so forth. Since a control page can cover a large range of data (1,000 times of data), prediction of control pages based on LBAs can generally be accurate. For instance, even if an estimated LBA for a seek point does not exactly correspond to the actual LBA for the seek point and is slightly off from the actual LBA (e.g., 1 MB), a control page that corresponds to the actual LBA can still be identified and loaded. Accordingly, determination of control pages may be more accurate than estimation of LBA ranges, according to certain aspects. In the example of FIG. 4, the control page 420a may cover the LBA range 410a and some subsequent data, the control page 420b may cover the LBA range 410b and some subsequent data, and the control page 420c may cover the LBA range 410c and some subsequent data.

The storage device 245 can load the control pages 420a-c into the buffer 247 in parallel for maximum parallelism. For example, the control pages 420a-c can be loaded into separate logical dies. Once the control pages 420a-c are loaded, the storage device 245 can determine physical addresses of the data for the LBA ranges 410a-c and retrieve the data 430a-c. Similar to the control pages 420a-c, the storage device 245 can retrieve the data 430a-c from the data storage 248 and load the data 430a-c into the buffer 247 in parallel. The storage device 245 may not perform any decoding with respect to the data 430a-c. The storage device 245 can transmit all or a portion of the data 430a-c to the media server 230, and the media server 230 can transmit all or a portion of the data 430a-c to the client computing device 210. For example, the storage device 245 can send the data 430a for the first seek point initially and send the data 430b-c for the rest of the seek points subsequently. The media player on the client computing device 210 can decode all or a portion of the data 430a-c to avoid a cache miss for one or more seek points. In some embodiments, the storage device 245 may add or send metadata for the data 430a-c. For example, the metadata can help the media player on the client computing device 210 decode the data 430a-c. In certain embodiments, the storage device 245 can notify the media server 230 and/or the client computing device 210 that data 430 for one or more additional seek points are available in the buffer 247. For instance, the media server 230 and/or the client computing device 210 can determine what action to perform based on the notification. The media server 230 may send the data 430 for one or more additional seek points to the client computing device 210 as appropriate.

The LBA ranges 410a-c are estimated and accordingly may not align with start of one or more frames and/or I-frames. Accordingly, the media player can navigate to a nearest keyframe or I-frame in the data 430a-c for playback. In some embodiments, the storage device 245 can determine a nearest keyframe or I-frame and load the actual data 430a-c into the buffer 247 starting with the nearest keyframe or I-frame.

Generally, contiguous media data is loaded into the buffer 247 for a media file (e.g., sequential data). For predictive caching for seek operations or scroll operations, the loaded control pages 420a-c are noncontiguous, and the loaded data 430a-c is also noncontiguous. Therefore, the storage device 245 can provide RAM segmentation with respect to the control pages 420a-c as well as the data 430a-c.

In this manner, the storage system 240/storage device 245 can perform predictive caching to load data for one or more seek points when a seek command is invoked. This can reduce latency in providing the data for the seek points to the media server 230 and the client computing device 210, which can provide more smooth media seeking at the media player. In addition, the storage system 240/storage device 245 can load control pages in parallel and data for the seek points in parallel, and can leverage parallelism to reduce the amount of time for predictive caching. Further, the storage system 240/storage device 245 can perform predictive caching without decoding media data, which can require a significant amount of resources. Therefore, an amount of resources and/or costs can be reduced in performing predictive caching. Predictive caching of data has been described in connection with playback of media data for illustrative purposes, and predictive caching can be performed for any type of data to which seek operations or scroll operations can be applied. As an example, predictive caching can be performed for seeking or scrolling of large documents. For instance, a seek operation can skip 10 pages as a seek interval. Many embodiments and variations are possible.

Figure 5:
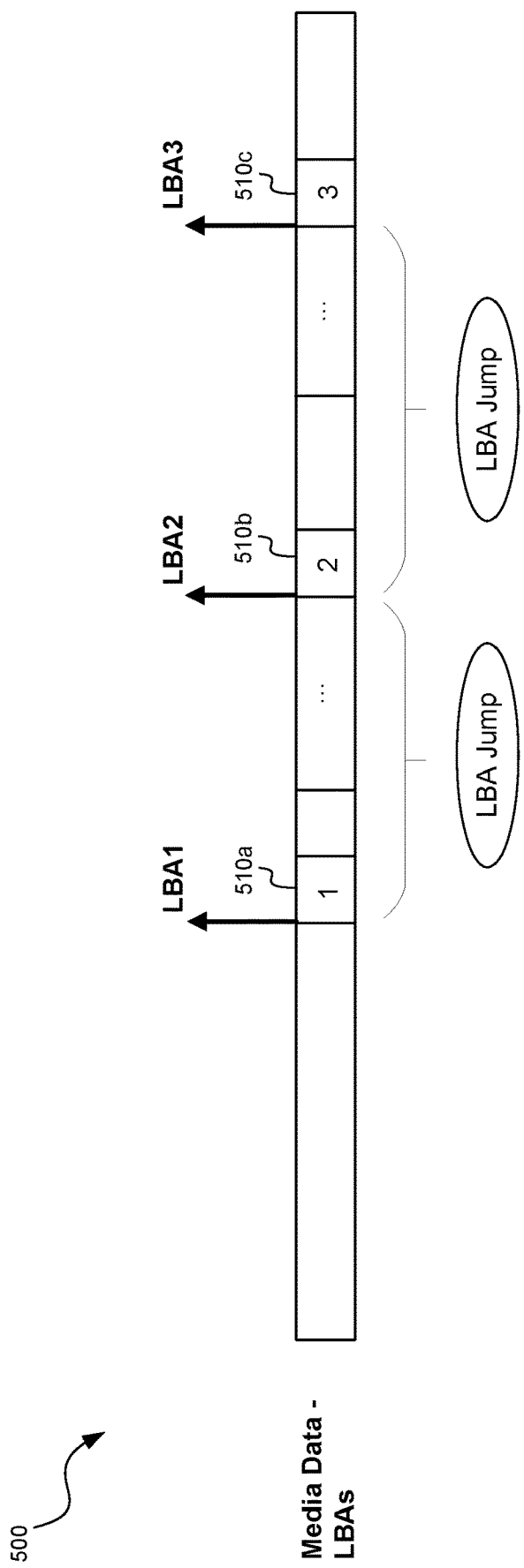
FIG. 5 illustrates a block diagram showing estimation of logical block address ranges corresponding to seek points, in accordance with one or more embodiments.

FIG. 5 illustrates a block diagram 500 showing estimation of LBA ranges corresponding to seek points, in accordance with one or more embodiments. In the example of FIG. 5, predictive caching for a media file is being performed for three seek points. An LBA range 510a can correspond to a first seek point, an LBA range 510b can correspond to a second seek point, and an LBA range 510c can correspond to a third seek point. LBA 1 can indicate the start LBA of the LBA range 510a, LBA 2 can indicate the start LBA of the LBA range 510b, and LBA 3 can indicate the start LBA of the LBA range 510c. As described in connection with FIG. 4, the start LBAs for the seek points can be determined in different ways. In some embodiments, supposing LBA 1 has been determined, LBA 2 can be determined based on the bit rate according to the below formula:

$$LBA\ 2 = LBA\ 1 + time\_seek\_to\_offset \qquad (3),$$

where time_seek_to_offset can indicate conversion of a seek interval to a number of bytes based on the bit rate. For example, it can be the product of the bit rate and the seek interval. LBA 3 can be determined in a similar manner. In certain embodiments, supposing LBA 1 has been determined, LBA 2 can be determined based on the frame length according to the below formula:

$$LBA\ 2 = LBA\ 1 + num\_of\_frames * frame\_length \qquad (4),$$

where num_of_frames can indicate a number of frames that corresponds to a seek interval and frame_length can indicate the frame length. The number of frames can be determined by the storage device 245, for example, based on the seek interval and the number of frames per second. For instance, the number of frames per second can be available from the media file. The frame length can be provided to the storage device 245 by the media server 230 and/or the client computing device 210. In some embodiments, the frame length can be an average frame length. In other embodiments, the frame length for one or more frames can be determined from a frame length list. For example, frame lengths of frames corresponding to the seek interval based on the number of frames can be added to determine an offset for LBA 2. An LBA determined according to formula (4) may be more accurate than an LBA determined according to formula (3). For instance, an LBA determined based on the frame lengths may generally be more accurate than an LBA determined based on the bit rate, according to certain aspects.

Figure 6:
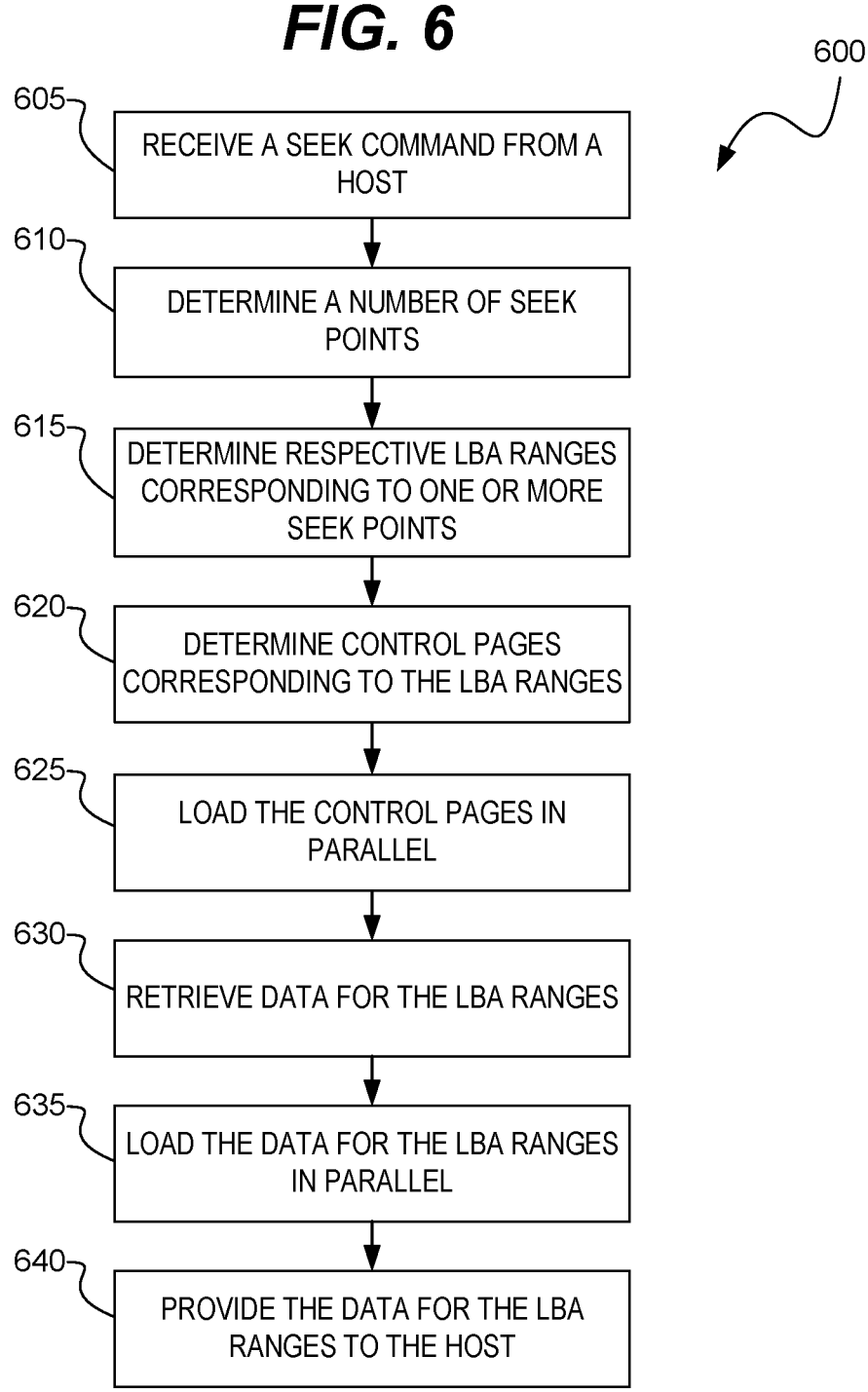
FIG. 6 illustrates a workflow process for predictive caching of media data, in accordance with one or more embodiments.

FIG. 6 illustrates a workflow process 600 for predictive caching of media data, in accordance with one or more embodiments. For example, the workflow process 600 may be performed by a controller of a storage system or a storage device, such as a storage system 240 or a storage device 245. For illustrative purposes, the process 600 is explained below in connection with the storage system 240. Certain details relating to the process 600 are explained in more detail with respect to FIGS. 1-5. Depending on the embodiment, the process 600 may include fewer or additional blocks, and the blocks may be performed in an order that is different from illustrated.

At block 605, the storage system 240 can receive a seek command from a host (e.g., a media server 230, a client computing device 210, etc.). The seek command can be associated with playback of a media file. In some embodiments, the seek command can include a seek interval. In certain embodiments, the seek interval is indicated in a unit of time. In other embodiments, the seek interval is indicated as a multiple of a predetermined value stored on the storage system 240. In some embodiments, the seek interval is not received from the host and is determined by the storage system 240.

In some cases, the storage system 240 can also receive other information from the host. In some embodiments, information received from the host includes one or more of: current data for playback, a bit rate for the media file, a frame length for the media file, or a frame length list for the media file.

At block 610, the storage system 240 can determine a number of seek points. In some embodiments, the number of seek points is determined based on a size of the buffer. In certain embodiments, the number of seek points is a predetermined value. For instance, the number of seek points can be 3 or 4 at a minimum.

At block 615, the storage system 240 can determine respective LBA ranges corresponding to one or more seek points. For example, the one or more seek points can be determined based on the seek interval according to the number of seek points. In certain embodiments, each LBA range includes a start LBA and an end LBA. In some embodiments, the start LBA of an LBA range is determined by adding an offset equal to a product of the bit rate and the seek interval to a current LBA or to a start LBA of a previous LBA range. In other embodiments, the start LBA of an LBA range is determined by adding an offset equal to a product of a number of frames and the frame length to a current LBA or to a start LBA of a previous LBA range. The number of frames can be determined based on the seek interval.

At block 620, the storage system 240 can determine control pages corresponding to the LBA ranges. In some embodiments, the determination of the respective control pages includes determining a control page covering a particular LBA range in a control table. In certain embodiments, a control page includes physical address information for an amount of data that exceeds (e.g., 1,000 times) the size of the control page. The determining of the respective control pages can include dividing the start LBA by a ratio of the amount of data to the size of the control page. For example, the ratio can be 1,000:1. In such case, the start LBA can be divided by 1,000.

At block 625, the storage system 240 can load the control pages in parallel. The storage system 240 can load the control pages to the buffer in parallel. At block 630, the storage system 240 can retrieve data for the LBA ranges. The storage system 240 can retrieve the data for the LBA pages based on physical addresses corresponding to the LBA ranges in the control pages. At block 635, the storage system 240 can load the data for the LBA ranges in parallel. The storage system 240 can load the retrieved data for the LBA ranges to the buffer in parallel. At block 640, the storage system 240 can provide the data for the LBA ranges to the host.

Figure 7:
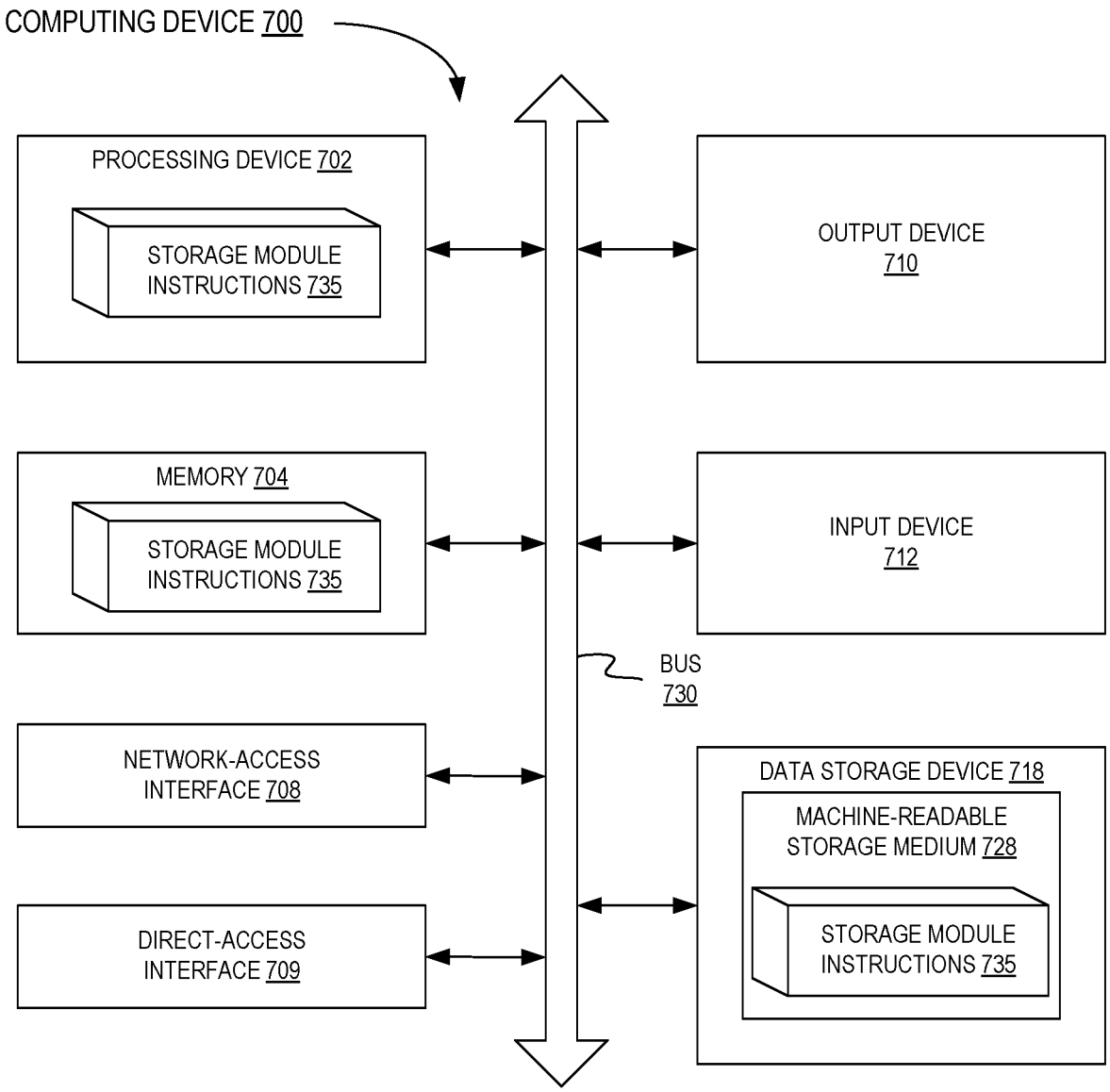
FIG. 7 is a diagram of a computing device, in accordance with one or more embodiments.

FIG. 7 is a diagram of a computing device 700, in accordance with one or more embodiments. The computing device 700 may execute instructions that may cause the computing device 700 to perform any one or more of the methodologies (e.g., operations, methods, functions, etc.) discussed herein. The computing device 700 may be a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 700 includes a processing device (e.g., a processor, a controller, a central processing unit (CPU), etc.) 702, a main memory 704 (e.g., read-only memory (ROM), flash memory, dynamic random access memory (DRAM) such as synchronous DRAM (SDRAM)), a network-access interface 708, a direct-access interface 709, an output device, 710, an input device 712, and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute storage module instructions 735 (e.g., instructions for the storage module 211 illustrated in FIG. 2) for performing the operations and steps discussed herein.

The computing device 700 may include a network-access interface 708 (e.g., a network interface card, a Wi-Fi interface, etc.) which may communicate with a network (e.g., network 170 illustrated in FIG. 1). The computing device may also include a direct-access interface 709 (e.g., a USB interface, an external Serial Advanced Technology Attachment (eSATA) interface, a Thunderbolt interface, etc.). The computing device 700 also may include an output device 710 (e.g., a liquid crystal display (LCD) or a cathode ray tube (CRT)), and an input device 712 (e.g., a mouse, a keyboard, etc.). In one embodiment, the output device 710 and the input device 712 may be combined into a single component or device (e.g., an LCD touch screen).

The data storage device 718 may include a computer-readable storage medium 728 on which is stored one or more sets of instructions (e.g., storage module instructions 735) embodying any one or more of the methodologies or functions described herein. The storage module instructions 735 may also reside, completely or at least partially, within the main memory 704 and/or within the processing device 702 during execution thereof by the computing device 700. The main memory 704 and the processing device 702 may also constitute computer-readable media. The instructions may further be transmitted or received over via the network-access interface 708 and/or direct-access interface 709.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

GENERAL COMMENTS

Those skilled in the art will appreciate that in some embodiments, other types of data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data storage device comprising:
   a non-volatile memory;
   a buffer; and
   a controller configured to:
      receive from a host a seek command associated with playback of a media file, the seek command including a seek interval;
      determine a number of seek points;
      estimate respective logical block address (LBA) ranges corresponding to one or more seek points based on the seek interval;
      determine respective control pages corresponding to the estimated LBA ranges;
      load the control pages to the buffer in parallel;
      load data corresponding to the estimated LBA ranges to the buffer in parallel based on the loaded control pages; and
      provide the loaded data to the host.

2. The data storage device of claim 1, wherein the number of seek points is determined based on a size of the buffer.

3. The data storage device of claim 1, wherein the number of seek points is a predetermined value.

4. The data storage device of claim 1, wherein the seek interval is indicated in a unit of time or is indicated as a multiple of a predetermined value stored on the data storage device.

5. The data storage device of claim 1, wherein information received from the host includes one or more of: current data for playback, a bit rate for the media file, a frame length for the media file, or a frame length list for the media file.

6. The data storage device of claim 5, wherein each LBA range includes a start LBA and an end LBA.

7. The data storage device of claim 6, wherein the start LBA of an LBA range is determined by adding an offset equal to a product of the bit rate and the seek interval to a current LBA or to a start LBA of a previous LBA range.

8. The data storage device of claim 6, wherein the start LBA of an LBA range is determined by adding an offset equal to a product of a number of frames and the frame length to a current LBA or to a start LBA of a previous LBA range.

9. The data storage device of claim 8, wherein the number of frames is determined based on the seek interval.

10. The data storage device of claim 6, wherein determining the respective control pages includes determining a control page covering a particular LBA range in a control table.

11. The data storage device of claim 10, wherein a control page includes physical address information for an amount of data that exceeds a size of the control page.

12. The data storage device of claim 11, wherein determining the respective control pages includes dividing the start LBA by a ratio of the amount of data to the size of the control page.

13. A method of performing predictive caching for media data in a data storage system, the method comprising:
   receiving from a host a seek command associated with playback of a media file, the seek command including a seek interval;
   determining a number of seek points;
   estimating respective logical block address (LBA) ranges corresponding to one or more seek points based on the seek interval;
   determining respective control pages corresponding to the estimated LBA ranges;
   loading the control pages to a buffer in parallel;
   loading data corresponding to the estimated LBA ranges to the buffer in parallel based on the loaded control pages; and
   providing the loaded data to the host.

14. The method of claim 13, wherein the seek interval is indicated in a unit of time or is indicated as a multiple of a predetermined value stored on the data storage system.

15. The method of claim 13, wherein information received from the host includes one or more of: current data for playback, a bit rate for the media file, a frame length for the media file, or a frame length list for the media file.

16. The method of claim 15, wherein each LBA range includes a start LBA and an end LBA.

17. The method of claim 16, wherein the start LBA of an LBA range is determined by adding an offset equal to a product of the bit rate and the seek interval to a current LBA or to a start LBA of a previous LBA range.

18. The method of claim 16, wherein the start LBA of an LBA range is determined by adding an offset equal to a product of a number of frames and the frame length to a current LBA or to a start LBA of a previous LBA range.

19. The method of claim 18, wherein the number of frames is determined based on the seek interval.

20. A data storage system comprising:
a non-volatile memory;
a buffer; and
a controller means configured to:
  receive from a host a seek command associated with playback of a media file, the seek command including a seek interval;
  determine a number of seek points;
  estimate respective logical block address (LBA) ranges corresponding to one or more seek points based on the seek interval;
  determine respective control pages corresponding to the estimated LBA ranges;
  load the control pages to the buffer in parallel;
  load data corresponding to the estimated LBA ranges to the buffer in parallel based on the loaded control pages; and
  provide the loaded data to the host.

* * * * *